(12) United States Patent
Song et al.

(10) Patent No.: US 7,787,087 B2
(45) Date of Patent: Aug. 31, 2010

(54) LIQUID CRYSTAL DISPLAY HAVING WIDE VIEWING ANGLE

(75) Inventors: Jang-Kun Song, Seoul (KR);
Kyeong-Hyeon Kim, Seongnam (KR);
Kye-Hun Lee, Suwon (KR); Hea-Ri Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/147,697

(22) Filed: Jun. 27, 2008

(65) Prior Publication Data

US 2008/0273154 A1 Nov. 6, 2008

Related U.S. Application Data

(60) Division of application No. 11/398,839, filed on Apr. 6, 2006, which is a continuation of application No. 11/183,744, filed on Jul. 19, 2005, now Pat. No. 7,050,134, which is a continuation of application No. 10/861,397, filed on Jun. 7, 2004, now Pat. No. 6,937,311, which is a continuation of application No. 10/269,861, filed on Oct. 15, 2002, now Pat. No. 6,778,244, which is a continuation of application No. 10/020,303, filed on Dec. 18, 2001, now Pat. No. 6,512,568, which is a continuation of application No. 09/314,293, filed on May 19, 1999, now Pat. No. 6,342,938.

(30) Foreign Application Priority Data

May 19, 1998 (KR) .................... 199818037

(51) Int. Cl.
*G02F 1/1337* (2006.01)

(52) U.S. Cl. ..................................... 349/130

(58) Field of Classification Search ......... 349/129–130, 349/141
See application file for complete search history.

(56) References Cited

U.S. PATENT DOCUMENTS 5,136,407 A 8/1992 Clerc (Continued)

FOREIGN PATENT DOCUMENTS

JP 62-131578 A 6/1987

(Continued)

OTHER PUBLICATIONS

Optimum Film Compensation Modes for TN and VA LCDs; J. Chen, K.-H. Kim, J.-J. Jyu, J. H. Souk; 21.2/Chen; SID 98 Digest.315.

(Continued)

*Primary Examiner*—James A Dudek
(74) *Attorney, Agent, or Firm*—Cantor Colburn LLP

(57) ABSTRACT

A tetragonal ring shape aperture is formed in the common electrode on one substrate and a cross shape aperture is formed at the position corresponding to the center of the tetragonal ring shape aperture in the pixel electrode on the other substrate. A liquid crystal layer between two electrodes are divided to four domains where the directors of the liquid crystal layer have different angles when a voltage is applied to the electrodes. The directors in adjacent domains make a right angle. The tetragonal ring shape aperture is broken at midpoint of each side of the tetragon, and the width of the aperture decreases as goes from the bent point to the edge. Wide viewing angle is obtained by four domains where the directors of the liquid crystal layer indicate different directions, disclination is removed and luminance increases.

7 Claims, 12 Drawing Sheets

U.S. PATENT DOCUMENTS

| | | | |
|---|---|---|---|
| 5,166,086 A | 11/1992 | Takeda et al. | |
| 5,229,873 A | 7/1993 | Hirose et al. | |
| 5,309,264 A | 5/1994 | Lien et al. | |
| 5,434,690 A | 7/1995 | Hisatake et al. | |
| 5,592,199 A | 1/1997 | Kawaguchi et al. | |
| 5,666,179 A * | 9/1997 | Koma | 349/143 |
| 5,670,994 A | 9/1997 | Kawaguchi et al. | |
| 5,726,077 A | 3/1998 | Kawahata et al. | |
| 5,777,700 A | 7/1998 | Kaneko et al. | |
| 5,796,456 A | 8/1998 | Takatori et al. | |
| 5,846,452 A | 12/1998 | Gibbons et al. | |
| 5,872,611 A | 2/1999 | Hirata et al. | |
| 5,923,310 A | 7/1999 | Kim | |
| 5,976,639 A | 11/1999 | Iwata | |
| 6,040,882 A | 3/2000 | Jun et al. | |
| 6,266,166 B1 | 7/2001 | Katsumata et al. | |
| 6,661,488 B1 | 12/2003 | Takeda et al. | |
| 6,710,837 B1 | 3/2004 | Song et al. | |
| 6,724,452 B1 | 4/2004 | Takeda et al. | |
| 6,819,384 B2 | 11/2004 | Nakanishi et al. | |
| 6,937,311 B2 | 8/2005 | Song et al. | |
| 7,167,224 B1 | 1/2007 | Takeda et al. | |
| 7,304,703 B1 | 12/2007 | Takeda et al. | |
| 2001/0052949 A1 | 12/2001 | Yamaguchi et al. | |
| 2005/0140887 A1 | 6/2005 | Song et al. | |

FOREIGN PATENT DOCUMENTS

| | | |
|---|---|---|
| JP | S63-300224 A | 12/1988 |
| JP | 03-002731 A | 1/1991 |
| JP | 03-274029 A | 12/1991 |
| JP | 04-157494 A | 5/1992 |
| JP | 04-331922 A | 11/1992 |
| JP | 05-019298 A | 1/1993 |
| JP | 05-040252 A | 2/1993 |
| JP | 05-243333 A | 9/1993 |
| JP | 05-303109 A | 11/1993 |
| JP | 05-323373 A | 12/1993 |
| JP | H05-333358 A | 12/1993 |
| JP | 6043461 A | 2/1994 |
| JP | 06-140296 A | 5/1994 |
| JP | 06-194656 A | 7/1994 |
| JP | 06-202132 | 7/1994 |
| JP | 06-202153 A | 7/1994 |
| JP | 06-230414 A | 8/1994 |
| JP | 06-230428 A | 8/1994 |
| JP | 06-273798 A | 9/1994 |
| JP | 07-013191 A | 1/1995 |
| JP | 07-028091 A | 1/1995 |
| JP | 07-049657 | 2/1995 |
| JP | 07-120772 A | 5/1995 |
| JP | 07-134301 A | 5/1995 |
| JP | 07-245405 A | 9/1995 |
| JP | 07-261199 A | 10/1995 |
| JP | 07-263700 A | 10/1995 |
| JP | 07-273346 A | 10/1995 |
| JP | 07-311383 A | 11/1995 |
| JP | 07-311390 A | 11/1995 |
| JP | 08015714 | 1/1996 |
| JP | 08101396 | 4/1996 |
| JP | 08-122822 A | 5/1996 |
| JP | 08-129180 A | 5/1996 |
| JP | 08-146464 A | 6/1996 |
| JP | 08-146465 A | 6/1996 |
| JP | 08-179341 A | 7/1996 |
| JP | 08-179343 A | 7/1996 |
| JP | 08-179372 A | 7/1996 |
| JP | 08-338995 A | 12/1996 |
| JP | 09-043610 A | 2/1997 |
| JP | 09-054323 A | 2/1997 |
| JP | H9-127540 A | 5/1997 |
| JP | 09-179141 A | 7/1997 |
| JP | 09-258266 A | 10/1997 |
| JP | 09-292624 A | 11/1997 |
| JP | 09-325373 | 12/1997 |
| JP | H10-10564 A | 1/1998 |
| JP | 10090708 | 4/1998 |
| JP | 10-197894 A | 7/1998 |
| JP | H10-198285 A | 7/1998 |
| JP | 10-214858 | 8/1998 |
| JP | 10-221707 A | 8/1998 |
| JP | 10-222097 A | 8/1998 |
| JP | 10-268349 A | 10/1998 |
| JP | H10-307301 | 11/1998 |
| JP | 11052381 A | 2/1999 |
| JP | 11-065472 A | 3/1999 |
| JP | 11-109356 A | 4/1999 |
| JP | 2000-235371 A | 8/2000 |
| JP | 2001-109018 A | 4/2001 |
| JP | 2002040400 A | 2/2002 |

OTHER PUBLICATIONS

XP-000722823; 33.3: Development of Super-High-Image-Quality Vertical-Alignment-Mode LCD; K. Ohmuro, S. Kataoka, T. Sasaki, Y. Kolke; Fujitsu Ltd., Atsugi, Japan; SID 97 Digets.845; May 13, 1997; p. 845-848.

A Super-High-Image-Quality Multi-Domain Vertical Alignment LCD by New Rubbing-Less Technology; A. Takeda, S. Kataoka, T. Sasaki, H. Chida, H. Tsuda, K. Ohmuro, Y. Koike, SID 98 Digest-1077-1080.

'311 Patent Invalidity; Improper Inventorship; Sharp RDX 002-RDX 228.

2 Separate substrates CDX 1095; '311 CDX; Samsung Memo of Nov. 5, 1997.

'311 Validity CDX 270-CDX 283; Samsung.

Complaint of Samsung Electronics Co., Ltd. Under Section 337 of the Tariff Act of 1930, As Amended; Dec. 21, 2007; Samsung; Investigatin No. 337-TA.

Denying Respondents' Motion for Summary Determination That Claims 7 and 8 of the '344 Patent Are Invalid; Order 17; Oct. 10, 2008' Investigation No. 337-TA-631.

Final Initial and Recommended Determination; Mar. 3, 2009; Investigation No. 337-TA-631.

'344 Claim Construction; RDX230-RDX246.

Complaint for Patent Infringement; Aug. 6, 2007; Demand for Jury Trial Case No. 2-07CV-330; Sharp.

'344 Validity—CDX250-CDX269 Samsung.

'344 Claim Construction; RDX254-RDX294 Sharp.

Commission Opinion; Investigation No. 337-TA-631; Jul. 14, 2009.

* cited by examiner

LIQUID CRYSTAL DISPLAY HAVING WIDE VIEWING ANGLE

CROSS REFERENCE TO RELATED APPLICATIONS

This application is a divisional application of U.S. application Ser. No. 11/398,839 filed Apr. 6, 2006, which is a continuation application of U.S. application Ser. No. 11/183,744 filed Jul. 19, 2005 and issued as U.S. Pat. No. 7,050,134, which is a continuation of U.S. application Ser. No. 10/861,397 filed Jun. 7, 2004 and issued as U.S. Pat. No. 6,937,311, which is a continuation application of U.S. application Ser. No. 10/269,861 filed Oct. 15, 2002 and issued as U.S. Pat. No. 6,778,244, which is a continuation application of U.S. application Ser. No. 10/020,303 filed Dec. 18, 2001 and issued as U.S. Pat. No. 6,512,568, which is a continuation application of U.S. application Ser. No. 09/314,293 filed May 19, 1999 and issued as U.S. Pat. No. 6,342,938, which claims priority to and the benefit of Korean Patent Application No. 1998-18037 filed on May 19, 1998, all of which are incorporated by reference herein in their entirety.

BACKGROUND OF THE INVENTION (a) Field of the Invention

The present invention relates to a liquid crystal display having wide viewing angle.

(b) Description of the Related Art

A liquid crystal display (LCD) includes two substrates and a liquid crystal layer interposed therebetween. The transmittance of the incident light is controlled by the strength of the electric field applied to the liquid crystal layer.

A vertically aligned twisted nematic (VATN) liquid crystal display has a couple of transparent substrates which have transparent electrodes on their inner surfaces and a couple of polarizers attached to their outer surfaces. The VATN LCD further includes a liquid crystal layer between the two substrates, and the liquid crystal layer has chirality and negative dielectric anisotropy.

In the off state of the LCD, i.e., in the state that no voltage is applied to the electrodes, the long axes of the liquid crystal molecules are aligned perpendicular to the substrates.

When the sufficient voltage difference is applied to the electrodes, an electric field perpendicular to the substrates and the liquid crystal molecules are rearranged. That is, the long axes of the liquid crystal molecules tilt in a direction perpendicular to the field direction or parallel to the substrates due to the dielectric anisotropy, and twist spirally with a pitch due to the chirality.

As described above, since the long axes of the liquid crystal molecules in the off state is perpendicular to the substrates, the VATN LCD having crossed polarizers may have sufficiently dark state. Therefore, the contrast ratio of the VATN LCD is relatively high compared with the conventional TN LCD. However, the viewing angle of the VATN LCD may not be so wide due to the difference in retardation values among viewing directions.

To overcome the above-described problem, multi-domain structures formed by varying rubbing directions in the alignment layers or by forming apertures in the transparent electrodes are proposed. Clere disclosed a structure having linear apertures in a transparent electrode in U.S. Pat. No. 5,136,407, and Hirose et al. disclosed an LCD using fringe fields to make the long axes of the liquid crystal molecules to be aligned in a direction between polarizing directions in U.S. Pat. No. 5,229,873. On the other hand, Lien proposed a structure having X-shaped apertures in a transparent electrode in U.S. Pat. No. 5,309,264, and Histake et al. disclosed a structure having apertures in both of the electrodes in U.S. Pat. No. 5,434,690.

However, the proposed structures may not have a sufficiently wide viewing angle and the luminance in their on states is not so high.

SUMMARY OF THE INVENTION

It is therefore an object of the present invention to widen the viewing angle of an LCD.

It is another object of the present invention to reduce the disclination of an LCD.

These and other objects, features and advantages are provided, according to the present invention, by forming apertures in field generating electrodes.

In detail, a liquid crystal display according to the present invention includes a first and a second substrate facing each other and a first and a second electrodes on inner surfaces of the first and the second substrates respectively. The first and the second electrodes face each other, and have a plurality of first apertures and a plurality of second apertures, respectively.

According to an aspect of the present invention, the first and the second apertures form a substantially closed area.

According to another aspect of the present invention, the boundaries of the first and the second apertures are linear, curved or bent with an obtuse angle.

According to another aspect of the present invention, the width of the first and the second apertures becomes larger as goes from the ends to the center.

According to another aspect of the present invention, the width of the first and the second apertures are 3-20 µm.

According to another aspect of the present invention, the distance between the first and the second apertures are 5-20 µm.

The liquid crystal display according to the present invention may include a liquid crystal layer between the first and the second substrates, a first and a second alignment layers on the first and the second electrodes, respectively, and a first and a second polarizers attached on the outer surfaces of the first and the second substrates, respectively. The liquid crystal layer has negative dielectric anisotropy, and the first and the second alignment layer force the long axes of the liquid crystal molecules to align perpendicular to the first and the second substrates. The polarizing directions of the first and the second polarizers are preferably perpendicular to each other. It is preferable that the number of the average directions of the long axes of the liquid crystal molecules in the domains defined by the first and the second apertures are four. Preferably, the average directions makes 45°±10° with the polarizing directions of the first and the second polarizers, and the average directions of the adjacent domains are substantially perpendicular to each other.

The shape of the first and the second electrodes according to the present invention makes the liquid crystal layer therebetween to be divided into four regions having different average directions of the long axes, thereby causing wide viewing angle. In addition, disclination due to the disorder of the liquid crystal molecules is reduced by adjusting the widths and shapes of the apertures.

DETAILED DESCRIPTION OF THE PREFERRED EMBODIMENTS

Figure 1A:
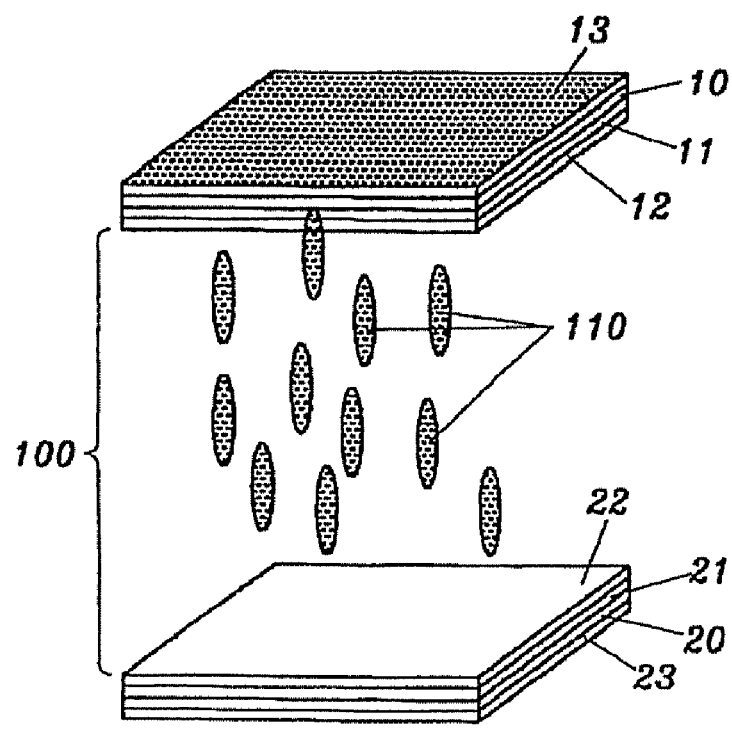
FIGS. 1A and 1B are schematic diagrams of a VATN LCD according to an embodiment of the present invention, respectively in black state and white state.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

Figure 1B:
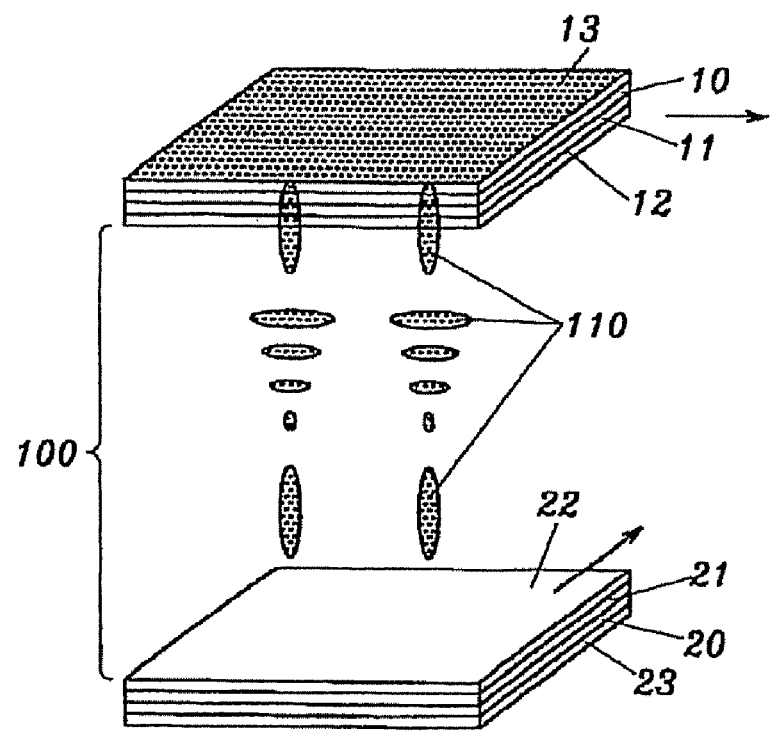

FIGS. 1A and 1B are schematic diagrams of a VATN LCD according to an embodiment of the present invention, respectively in black state and white state.

As shown in FIGS. 1A and 1B, two glass or quartz insulating substrates 10 and 20 faces each other with being spaced apart from each other. Field generating electrodes 11 and 21 made of a transparent conductive material such as ITO (indium tin oxide) or the like are formed on the inner surfaces of the substrates 10 and 20, respectively, and homeotropic alignment layers 12 and 22 are formed thereon, respectively. A liquid crystal layer 100 including a nematic liquid crystal having negative dielectric anisotropy is interposed between the substrates 10 and 20. The liquid crystal layer 100 may have chirality or the alignment layers 12 and 22 may be rubbed in some directions so that the director of the liquid crystal layer 100 twists from the one alignment layer to the other. Polarizers 13 and 23 are attached on the outer surfaces of the substrates 10 and 20, respectively, and polarize the rays out of the liquid crystal layer 100 and the rays incident on the liquid crystal layer 100, respectively. The polarizing directions of the polarizers 13 and 23 are perpendicular to each other. The alignment layers 12 and 22 may be rubbed or not.

FIG. 1A shows the off state that there is no potential difference between the electrodes 11 and 21. In this case, long axes or molecular axes of the liquid crystal molecules 110 in the liquid crystal layer 100 are aligned perpendicular to the surfaces of the substrates 10 and 20 due to the aligning force of the alignment layers 12 and 22.

In this state, the incident light linearly polarized by the polarizer 23 attached to the lower substrate 20 passes through the liquid crystal layer 100 without changing its polarization. Then, the light is blocked by the analyzer 13 attached to the upper substrate 10 to make the LCD in a black state.

When the potential difference is applied between the two electrodes 11 and 21, an electric field perpendicular to the substrates 10 and 20 are generated, and thus the liquid crystal molecules are rearranged.

FIG. 1B shows the on state that the sufficient electric field due to the high potential difference between the electrodes 11 and 21 is applied to the liquid crystal layer 100. The molecular axes of the liquid crystal molecules in the liquid crystal layer 100 becomes perpendicular to the field direction or parallel to the substrates 11 and 21 due to the dielectric anisotropy. However, the molecules 110 near the surface of the alignment layers 12 and 22 remains in its initial state since the aligning force by the alignment layers 12 and 22 is much larger than the force due to the dielectric anisotropy. Furthermore, the liquid crystal director twists spirally due to the chirality or rubbing. By adjusting the chirality of the liquid crystal layer 100, the twist angle of the liquid crystal director from the lower substrate 10 to the upper substrate 20 may made to be 90°.

The incident light linearly polarized by the polarizer 23 passes through the liquid crystal layer 100 and its polarization rotates by 90° according to the twist of the liquid crystal director. Therefore, the light passes through the analyzer 13 to make the LCD in a white state.

Figure 2:
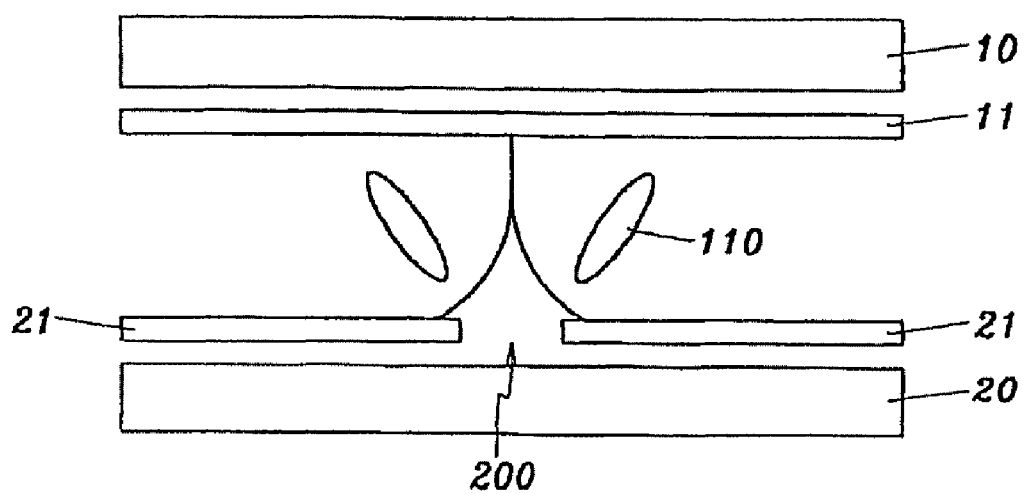
FIG. 2 is a schematic sectional view of a VATN LCD according an embodiment of the present invention

FIG. 2 shows the schematic structure of a VATN LCD having apertures in electrodes according to an embodiment of the present invention. For convenience, only substrates and electrodes are depicted and the other elements such as alignment layers are abbreviated.

As shown in FIG. 2, field-generating electrodes 11 and 21 are formed on the upper and the lower substrates 10 and 20, respectively, and the electrode 21 formed on the lower substrate 20 has an aperture 200.

In absence of electric field, the long axes of the liquid crystal molecules 110 are aligned perpendicular to the substrates 10 and 20, as shown in FIG. 1A.

If the electrodes 11 and 21 have potential difference, an electric field is generated. Although the field direction in most regions is perpendicular to the substrates 10 and 20, the field direction near the aperture 200 is not completely perpendicular to the substrates 10 and 20, and the electric field is symmetrical with respect to the aperture 100. The electric field near the aperture 200 is called the fringe field. The long axes of the liquid crystal molecules are not perpendicular to the substrates 10 and 20 and make some angle. The arrangement of the liquid crystal molecules are almost symmetrical with respect to the aperture 200 and the liquid crystal molecules in opposite regions with respect to the aperture 200 are arranged in opposite manner, thereby causing wide viewing angle.

The strength of the fringe field is large near the aperture and becomes smaller as goes far from the aperture. Accordingly, if the distance between the apertures is properly adjusted, the liquid crystal molecules located between the apertures are sufficiently affected by the fringe field. The liquid crystal layer is divided into several regions or domains defined by the apertures, and the average axial direction, which means the average direction of the long axes of the liquid crystal molecules, in each domain is varied according to the shapes and arrangement of the apertures.

Since the aperture 200 is formed when a conductive layer is patterned to form the electrode 21 by using photolithography, no separate step for forming the aperture 20 is required, and thus it is very easy to obtain a multi-domain LCD compared with other methods using such as rubbing. In addition, the locations and the shapes of the domains can be finely adjustable because of the use of the photolithgraphy. In the meantime, a plurality of wires (not shown) for supplying signals to the electrode 21 may be provided on the lower substrate 20. In this case, portions of the electrode 11 on the upper substrate 10 located at the position corresponding to wires on the lower substrate 20 may be removed in order to reduce the parasitic capacitance between the electrode 11 and the wires.

As described above, the apertures 200 may have various shapes and arrangements, and the apertures may be formed in both electrodes or either of the electrodes. Since the shapes and arrangements of the apertures affects on the average axial directions of the domains and characteristics such as luminance, response time and afterimages, etc., of the LCD panels, they should be properly designed.

The aperture pattern for a multi-domain LCD according to the present invention satisfies the following conditions:

First, it is preferable that the number of the domains which have different average axial directions, especially in a pixel, is at least two, and more preferably the number is four. The average axial direction of each domain, when viewed from the top, preferably makes 45°±10°, more preferably 45° with the polarizing directions of the polarizers especially when using crossed polarizers. In addition, it is preferable that the average axial directions of the adjacent domains are perpendicular to each other.

Second, it is preferable that the apertures on the upper and the lower substrates form substantially closed areas and thus substantially closed domains, when viewed from the top. It is because that the texture where the arrangement of the liquid crystal molecules is disordered is generated near the ends of the apertures, and thus the ends of the apertures are preferably closely located. Furthermore, the boundaries of the apertures are preferably linear, slowly curved or bent with an obtuse angle in order to make the arrangement of the liquid crystal molecules to be uniform, thereby reducing the response time. In particular, when the apertures on the lower and upper substrates face each other and form a substantially closed area, it is preferable that the boundaries of the facing portions of the apertures are preferably linear, slowly curved or bent with an obtuse angle. It is preferable that the width of the aperture becomes larger as goes from the ends to the center. The aperture patterns may be rectangular.

Finally, the width of the aperture and the distance between the apertures are preferably 3-20 µm and 5-20 µm. If the width of the aperture is larger than the former value or the distance between the apertures is less than the latter value, the aperture ratio is reduced, thereby reducing luminance and transmittance. On the contrary, if the width of the aperture is less than the former value or the distance between the apertures is larger than the latter value, the strength of the fringe field becomes week, thereby increasing response time and generating disordered textures.

Figure 3:
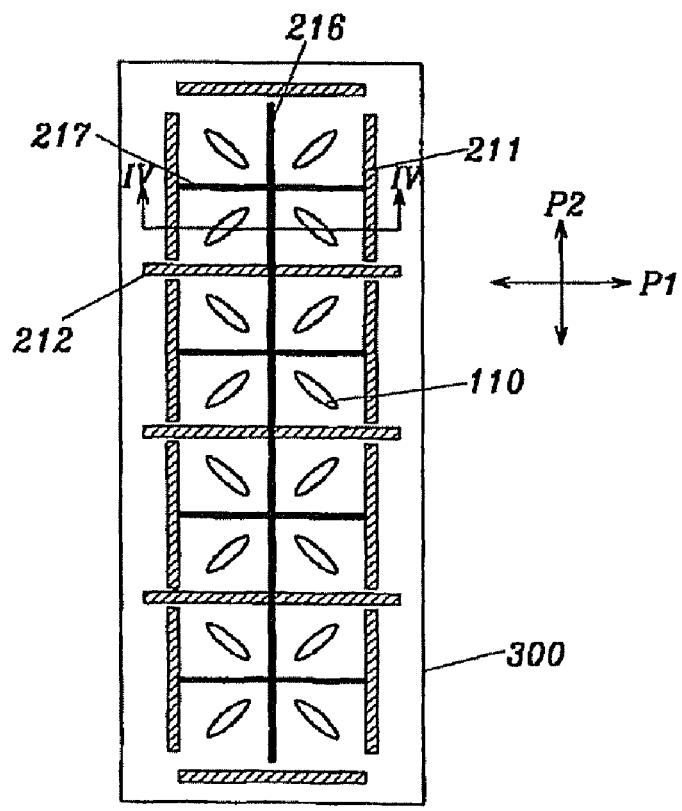
FIG. 3 is a layout view of apertures in electrodes of a VATN LCD according to the first embodiment of the present invention.
Figure 4:
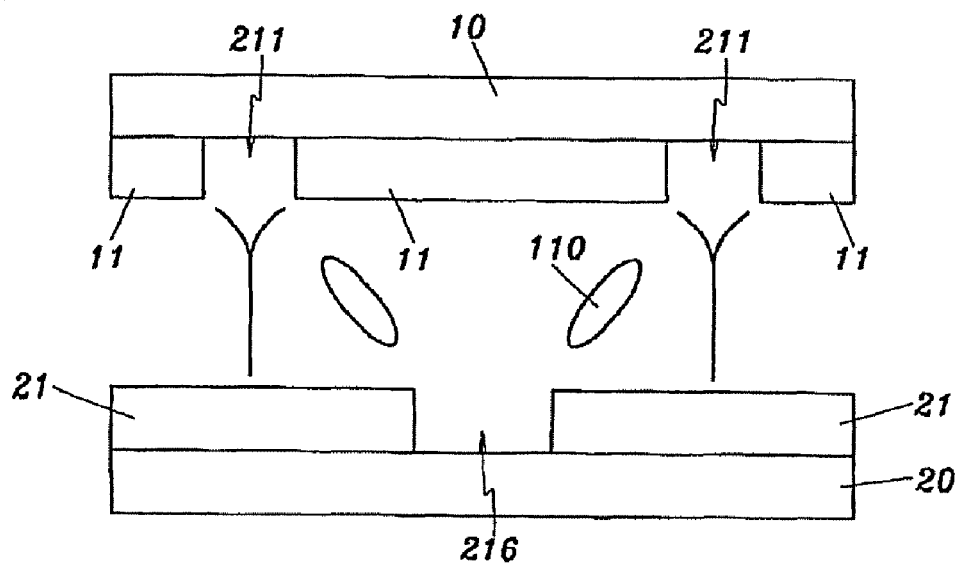
FIG. 4 is a sectional view of a liquid crystal display taken along the line IV-IV in FIG. 3.

Now, considering these conditions, the first embodiment of the present invention will be described with reference to FIGS. 3 and 4. Although an LCD has a plurality of pixels, FIGS. 3 and 4 show a single pixel region 300. In addition, only aperture patterns are illustrated in FIGS. 3 and 4, and other elements such as TFTs, wires, etc., are not illustrated.

As shown in FIGS. 3 and 4, a plurality of linear apertures 211, 212, 216 and 217 are formed in a rectangular pixel region 300. A plurality of first and second apertures 211 and 212 extending in transverse and longitudinal directions respectively are formed in an electrode 11 on an upper substrate 10, and a cross-shaped aperture 216 and 217 including first and second portions 216 and 217 extending in the transverse and longitudinal directions respectively are formed in an electrode 21 on a lower substrate 20.

The first and the second apertures 211 and 212 are separated from each other, arranged in the longitudinal direction, and form four large squares which is substantially closed.

The first portion 216 of the lower aperture passes through the center of the pixel 300 in the longitudinal direction, and thus through the center of the large squares formed by the first and the second apertures 211 and 212, and both ends of the first portion 216 approaches the second apertures 212. The plurality of second portions 217 passes through the center of the large squares in the transverse direction, and both ends of the second portion 216 approaches the first apertures 211.

As a result, the apertures 211, 212, 216 and 217 form small squares which define domains, and two edges of the small square is two apertures 211 and 212 on the upper substrate 10, while the other two edges of the small square is two apertures 216 and 217 on the lower substrate 20.

The arrangement of the liquid crystal molecules is described with reference to FIG. 4.

As shown in FIG. 4, the liquid crystal molecules incline due to the fringe field near the apertures. The adjacent apertures 211 and 216 on the different substrates 10 and 20 result in a fringe field which forces the liquid crystal molecules between the apertures 211 and 216 to align in the same direction, i.e., the direction from the aperture 216 to the aperture 211. Accordingly, the tilt directions of the liquid crystal molecules in the opposing regions with respect to the apertures are different.

In the meantime, since the adjacent apertures defining a domain are perpendicular to each other, the director of the liquid crystal layer varies in accordance with position. However, the average axial direction in a square domain becomes the direction from the intersection of the first and the second portions 216 and 217 to the intersection of the extensions of the first and the second apertures. That is, the average axial direction in a square domain is the direction from the center to the corner of the large square formed by the first and the second apertures 211 and 212. This arrangement of the aperture makes sixteen square domains in a pixel, and the average axial direction of each domain is one of four directions. The average axial directions of the adjacent domains are perpendicular to each other when viewed from the top.

When the polarizing directions P1 and P2 of the polarizers are aligned in the transverse and the longitudinal directions respectively, the polarizing directions P1 and P2 have an angle of 45° relative to the average axial direction of each domain when a sufficient voltage is applied.

In the LCDs having the aperture pattern shown in FIG. 3, the liquid crystal molecules are rearranged by the force due to the electric field immediately after the voltage is applied. However, the arrangement of the liquid crystal molecules is slowly changed by the tendency to be parallel to each other, which the molecules of the nematic liquid crystal have. Accordingly, it takes some time to reach a stable state that the movement of the liquid crystal molecules disappears, thereby causing large response time.

Figure 5:
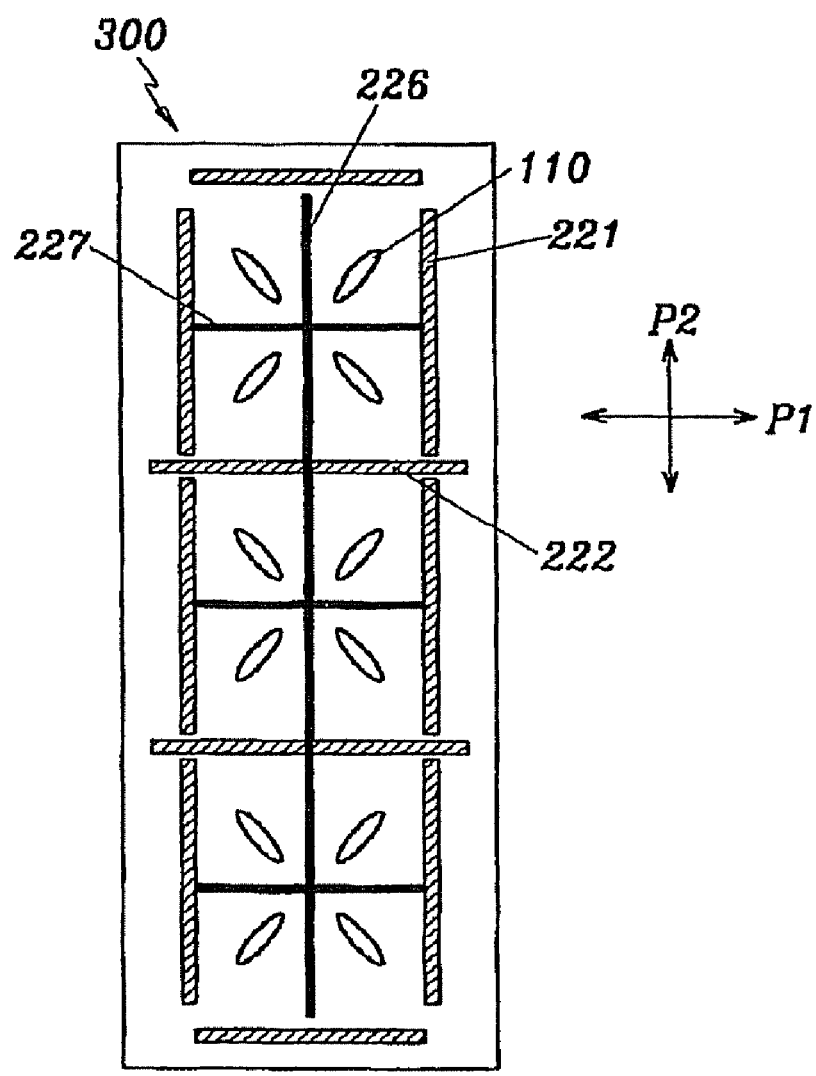
FIG. 5 is a layout view of apertures in electrodes of a VATN LCD according to the second embodiment of the present invention.

An aperture pattern according to the second embodiment of the present invention shown in FIG. 5 is similar to the aperture pattern shown in FIG. 3 except for rectangular shape of the domains instead of square shape. That is, longitudinal apertures 221 and 226 are longer than transverse apertures 222 and 227. Accordingly, when viewed from the top, an angle made by the average axial directions in the adjacent domains is not exactly 90°, and an angle between the polarizing directions and the average axial directions is not exactly 45°. However, in this case, one of the transverse or longitudinal directions is preferred by the liquid crystal molecules because the long axes of the liquid crystal molecules makes a less angle with one of the two directions than with the other. Since the rearrangement of the liquid crystal molecules quickly occurred and becomes stable, the response time is relatively short than the LCD shown in FIG. 3.

A liquid crystal display exhibiting less response time is now described.

Figure 6:
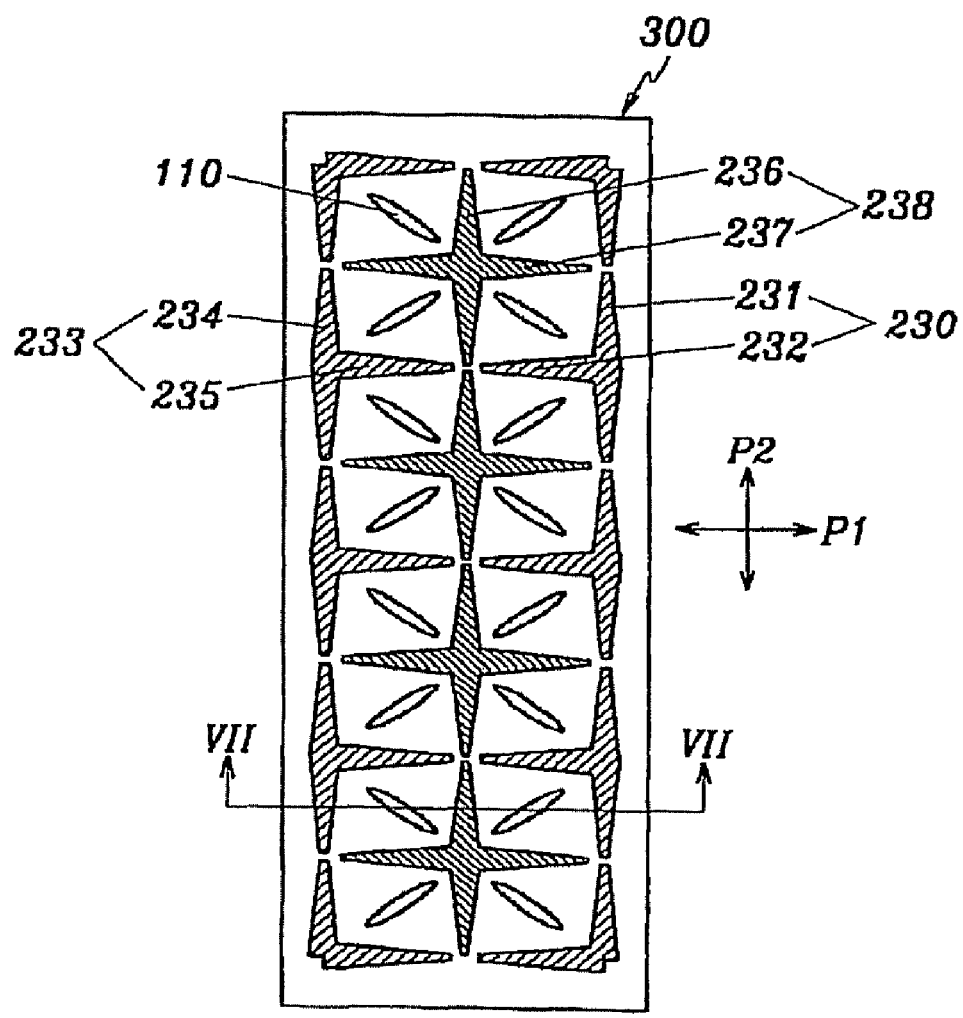
FIG. 6 is a layout view of apertures in electrodes of a VATN LCD according to the third embodiment of the present invention.

FIG. 6 is a layout view of an aperture pattern of an LCD according to a third embodiment of the present invention, and FIG. 5 is a sectional view of the LCD shown in FIG. 6 taken along the line VII-VII'.

Figure 7:
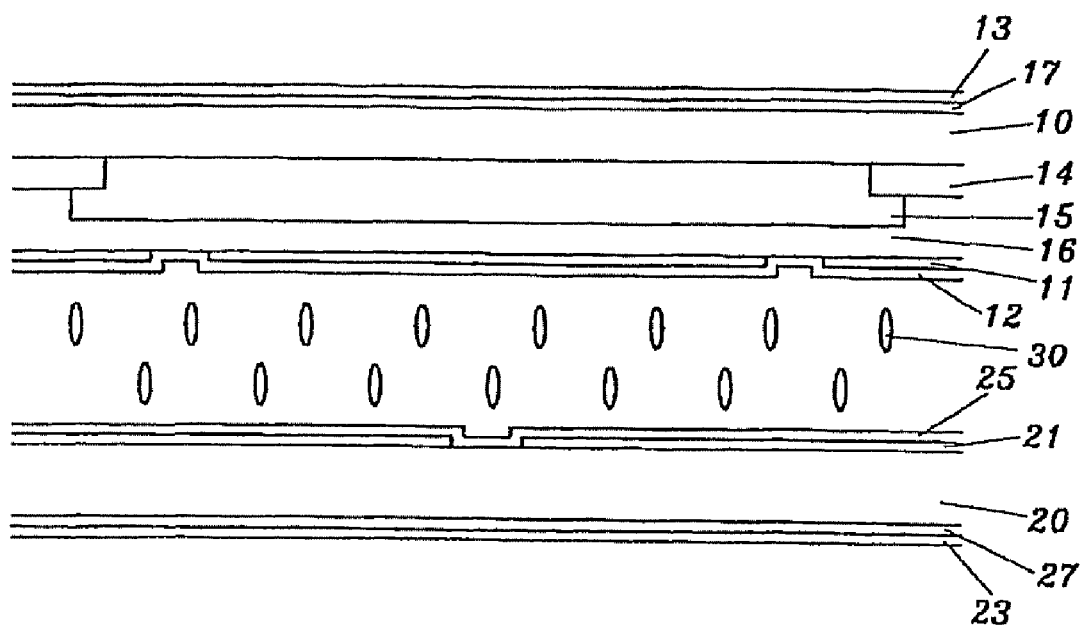
FIG. 7 is a sectional view of a liquid crystal display taken along the line IV-IV in FIG. 6.

As shown in FIGS. 6 and 7, an LCD according to the third embodiment of the present invention includes a lower TFT (thin film transistor) panel 20 and an upper color filter panel 10. Though it is not shown in the figures, a plurality of gate lines and data lines are formed on the inner surface of the TFT panel 20, and a pixel electrode 20 and a TFT (now shown) as a switching element are formed in a lower pixel region surrounded by the gate lines and data lines. On the inner surface of the color filter panel 10 opposite to the TFT panel 20, a black matrix pattern 14 which defines an upper pixel region corresponding to the lower pixel region in the TFT panel is formed, and a color filter 15 is formed therebetween. A passivation layer 16 covers the black matrix 14 and the color filter 15, and a common electrode 11 is formed thereon. A plurality of apertures 230, 233 and 238 are formed in the common electrode 11 and the pixel electrode 21, and homeotropic alignment layers 25 and 15 are formed on the pixel electrode 21 and the common electrode 11, respectively.

Polarizers 13 and 23 are attached to the outer surfaces of the substrates 10 and 20, respectively, and retardation films 17 and 27 are interposed between the polarizers 13 and 23 and the substrates 10 and 20, respectively. An a-plate compensation film and a c-plate compensation film may be attached to respective substrates, or two c-plate compensation films may be attached the both substrates 10 and 20. A biaxial compensation film may be used instead of the uniaxial compensation film, and, in this case, the biaxial compensation film may be attached to only one substrate. The slow axis, which is the direction having a largest refractive index, of the a-plate or biaxial compensation film may be parallel or perpendicular to the polarizing directions. It is preferable that the second slow axis of the biaxial compensation film coincides the transmission or absorption axes of the polarizers.

The shapes of the apertures 230, 233 and 238 are basically similar to those of the LCD shown in FIG. 3 according to the first embodiment. In detail, the apertures 230 and 233 on the color filter panel 10 includes longitudinal parts 231 and 234 and transverse parts 232 and 235 extending from the center of the longitudinal parts 231 and 233 in the left or right direction. The apertures 233 and 230 located near the left and right edges of the pixel is symmetrically arranged with respect to the longitudinal central line of the pixel, and form four large rectangles (almost squares) arranged in the longitudinal direction. The plurality of the apertures 238 on the TFT panel 20 have cross shapes including transverse parts 237 and longitudinal parts 236 crossing each other, and the centers of the apertures 238 are located at the center of the large rectangles.

It is preferable that the ends of the apertures 230, 233 and 238 on the substrates 10 and 20 are as close as possible such that the domain defined by the apertures 230, 233 and 238 form a substantially closed area when viewed from the top.

The width of the apertures 230, 233 and 238 is largest at the center, and decreases as goes to the ends. Therefore, the boundaries of the apertures 230, 233 and 238 are bent with obtuse angle, and the angle made by two apertures on the different substrates are acute angle when viewed from the top. As a result, the domain defined by the apertures 13 and 23 has the diagonal substantially perpendicular to the average axial direction which is longer than the diagonal substantially parallel to the average axial direction. The ratio of the diagonal perpendicular to the average axial direction with respect to the diagonal parallel to the average axial direction becomes larger if the width difference between the central portion and the end portion of the apertures 230, 233 and 238 is more enlarged at the bent point. Since the liquid crystal molecules become more uniformly aligned as the apertures 13 and 23 are parallel to each other, the response time becomes reduced as the ratio becomes large.

In this embodiment, the average axial directions of the adjacent domains makes 90 degrees, and the polarizing directions P1 and P2 of the polarizers 13 and 23 are perpendicular to each other and makes 45 degrees with the average axial direction of each domain.

According to the third embodiment, four tetragonal rings formed of the apertures exist in a unit pixel. However, the number of the rings may vary according to the conditions such as the size of the pixel. Still, to obtain the optimum luminance, the apertures preferably form regular tetragonal rings.

The width of the apertures 230, 233 and 238 is preferably in the range of 3-20 μm as described above.

The distance between the central points of the apertures 230, 233 and 238 on the different substrates 10 and 20, which is largest distance between the apertures, is in the range of 10-50 μm and more preferably in the range of 23-30 μm. However, it depends on the size or the shape of the pixel.

Figure 8:
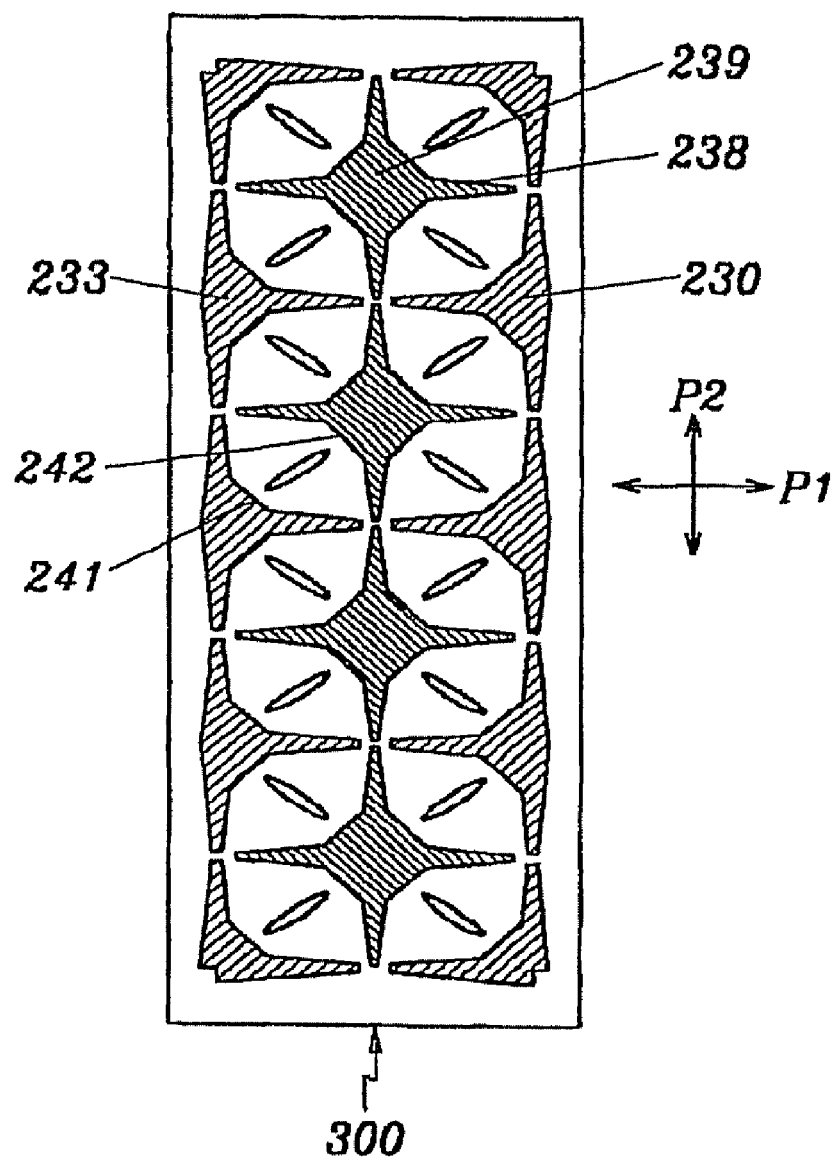
FIGS. 8 and 9 are layout views of apertures in electrodes of VATN LCDs according to the fourth and fifth embodiments of the present invention.
Figure 9:
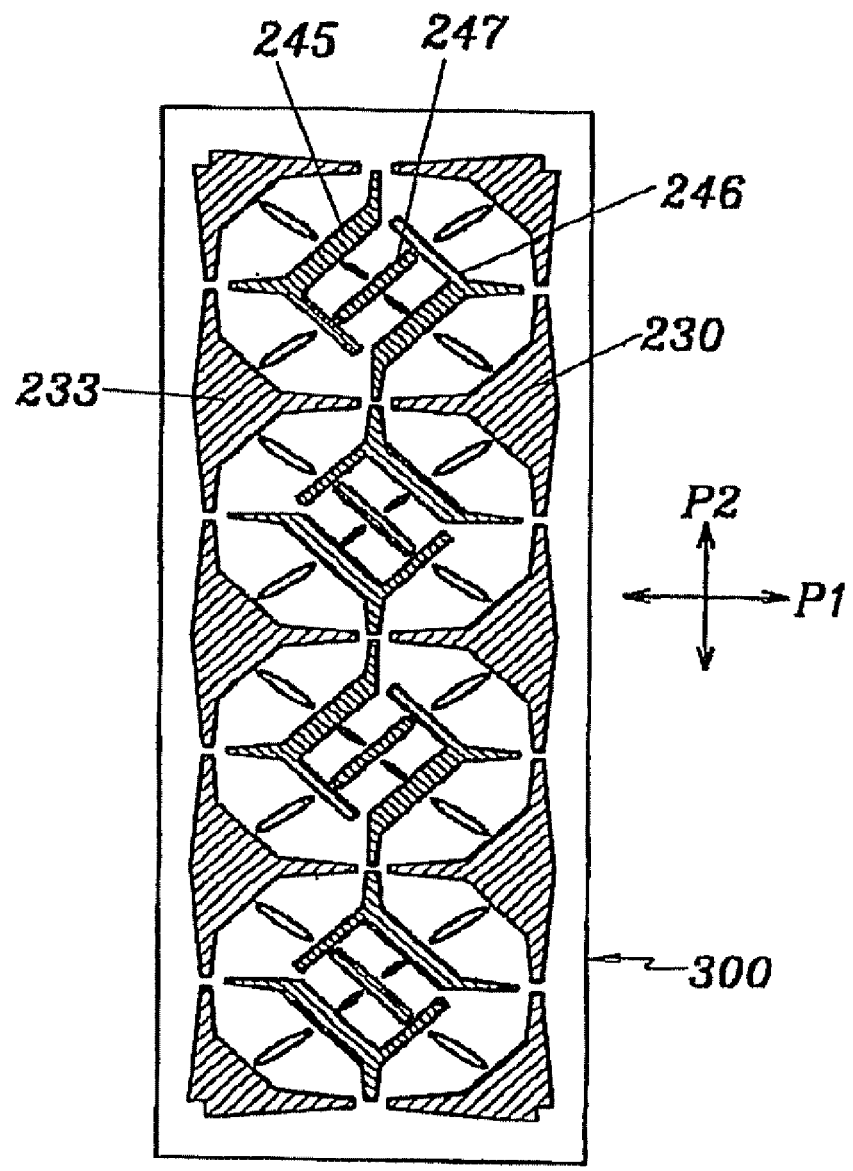

Now, a fourth embodiment of the present invention is described with reference to FIG. 8.

As shown In FIG. 6, the shape of apertures is similar to that of the third embodiment. However, the boundaries of the apertures 230, 233 and 238 are bent twice while those in the third embodiment once, when only a domain is considered. In addition, considering only a domain, the edges 241 and 242 generated by the twice bending of the boundaries of the apertures 230, 233 and 238 on the different substrates 10 and 20 are parallel to each other. In other words, the central portions of the apertures 230, 233 and 238 expand to the center of the domain, the central portions 239 of the apertures 238 becomes square. Accordingly, the distance between the apertures 230, 233 and 238 becomes much smaller, and the boundaries of the apertures 230, 233 and 238 approaches linear shape, thereby decreasing response time. However, since the area occupied by the apertures 233, 233 and 238 becomes larger, the aperture ratio decreases.

To solve this problem, the central portion 239 of the aperture 238 on the lower substrate 20 in the fourth embodiment becomes square ring instead of square in the fifth embodiment. The cross shaped aperture 238 is divided two portions 245 and 246 in order to prevent the isolation of the portion of the electrode surrounded by the central portion of the aperture 238. That is, two adjacent edges of the square ring is connected to each other, but disconnected to the remaining two edges. Furthermore, an aperture 247 parallel to the opposing edges of the square ring is added. As a result, two domains are added in the square ring, and the aperture ratio increases.

Figure 10:
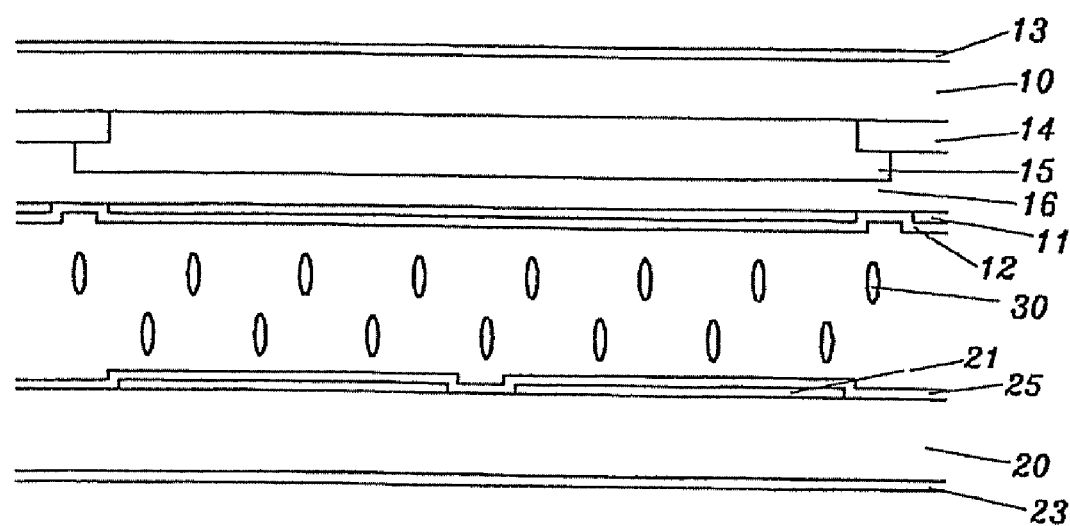
FIG. 10 is a sectional view of a liquid crystal display according to an embodiment of the present invention.

In the first to the fifth embodiments of the present invention, aperture ratio and luminance may be improved if edge portions of the apertures 230 and 233 on the upper substrate 10 are placed outside the pixel electrode 21 as shown in FIG. 10.

The shapes of the apertures on the two substrates may be exchanged.

Figure 11:
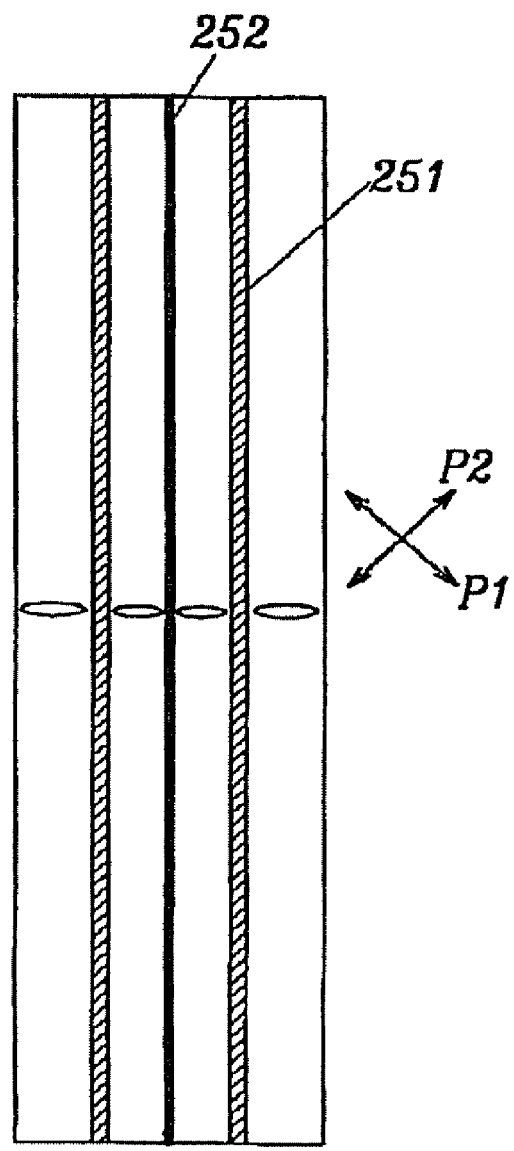
FIGS. 11 to 15 are layout views of apertures in electrodes of VATN LCDs according to the sixth to tenth embodiments of the present invention.

In order to obtain less response time, it is preferable that the apertures on the different substrates are parallel to each other, which is the sixth embodiment shown in FIG. 11.

A linear aperture 252 extending longitudinally is formed in the center of a pixel electrode on a TFT panel 20, and two linear longitudinal apertures 251 on a color filter panel 10 are located left and right to the aperture 252, and thus the apertures on the different substrates are arranged alternately.

Polarizing directions P1 and P2 are perpendicular to each other and make an angle of 45° with respect to the extension of the apertures 251 and 252.

In this case, since the liquid crystal molecules in a domain uniformly incline in the same direction, i.e., the direction perpendicular to the aperture, the response time is very fast as about 30 ms. However, in this case, only 2 average axial directions are generated, and the viewing angle is not good compared with the former embodiments.

Figure 12:
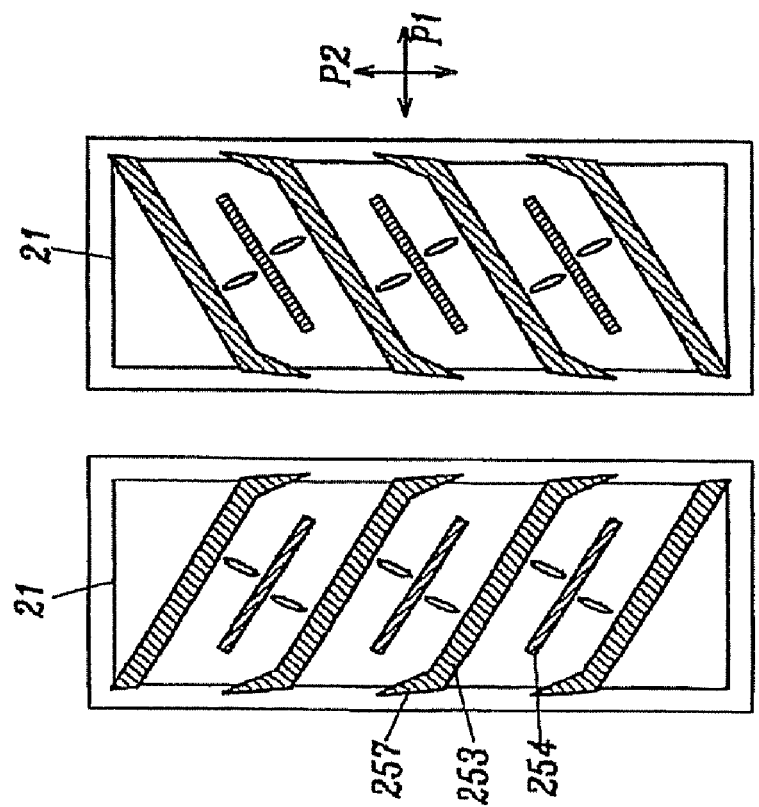

Another aperture pattern for obtaining fast response time as well as four average axial directions is provided in the seventh embodiment of the present invention shown in FIG. 12.

FIG. 12 shows two adjacent pixels 310 and 320 and an aperture pattern formed thereon. Apertures 253 and 255 on the upper substrate 10 and apertures 254 and 256 extend obliquely to make an angle with the transverse and the longitudinal directions. The apertures 253, 254, 255 and 256 in a pixel 310 and 320 are parallel to each other, and the extensions of the apertures in the adjacent pixels makes an angle such as 90 degrees. In this case, a pair of pixels yields 4 different average axial directions.

Polarizing directions P1 and P2 are aligned in the transverse and longitudinal directions.

The disclination that the liquid crystal molecules are disordered may be generated near the intersections of the pixel electrodes and the apertures 254 and 256 on the lower substrate 20, more exactly, at the portion where the apertures makes an obtuse angle with the pixel electrode. The disclination reduces the luminance of the LCD, and afterimage may be generated since the position of the disclination region varies according to the applied voltage.

Figure 13:
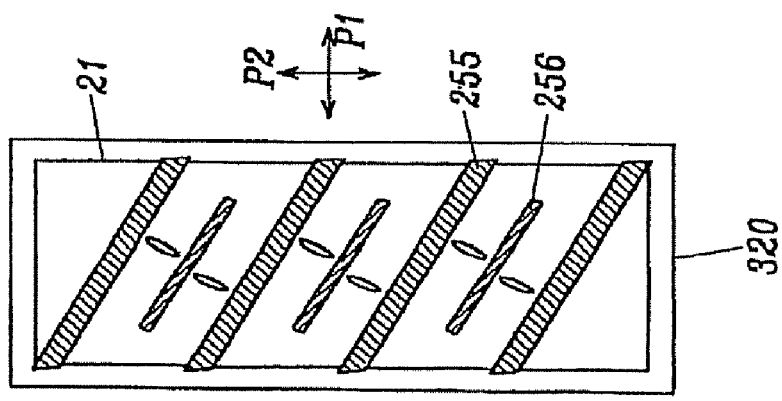
Figure 13:
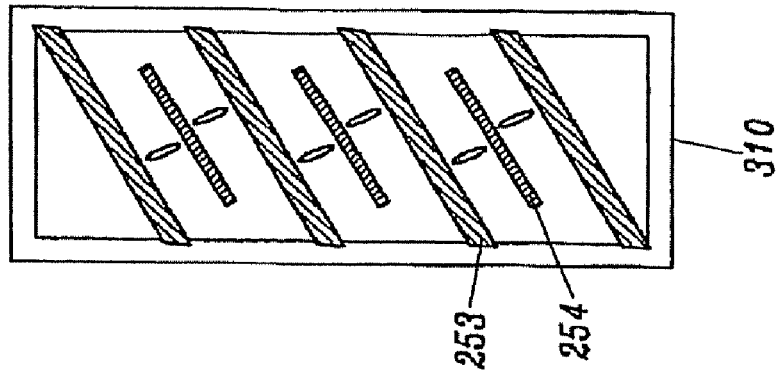

FIG. 13, which illustrate the eighth embodiment of the present invention, shows a branch 257 of the aperture 253 on the color filter substrate, which extends to the point where the boundary of the pixel electrode 21 and the aperture 253 make an obtuse angle along the edges of the pixel electrode 21. The width of the branch 257 may gradually decrease from the connection with the apertures 253 to the ends. This shape decreases the disclination and increases the luminance.

According to the seventh and the eighth embodiments, two average axial directions exist in a pixel, and four average axial directions in a pair of the pixel regions.

Figure 14:
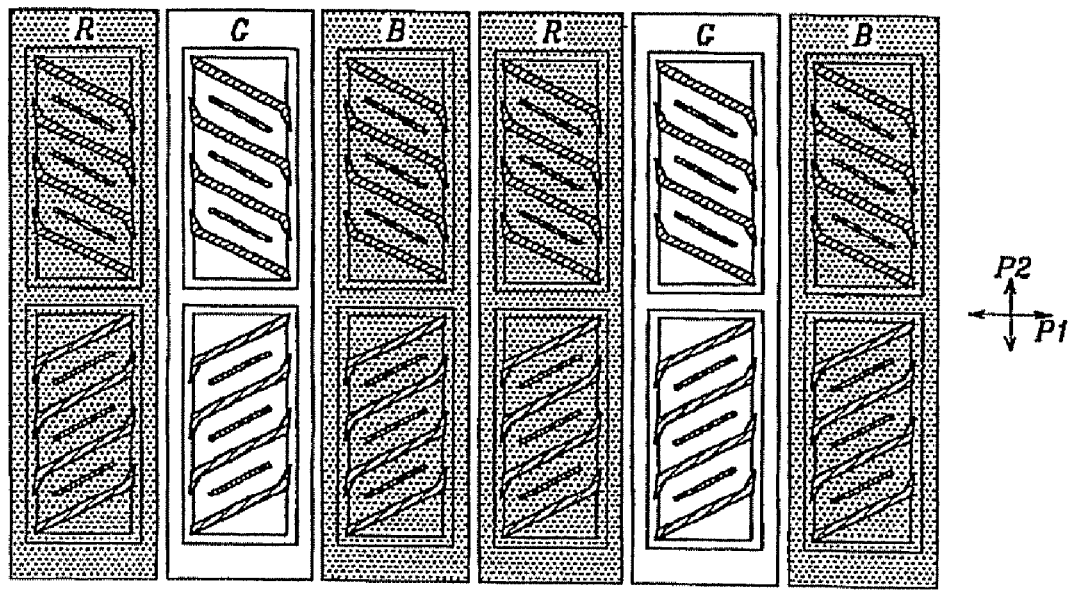
Figure 15:
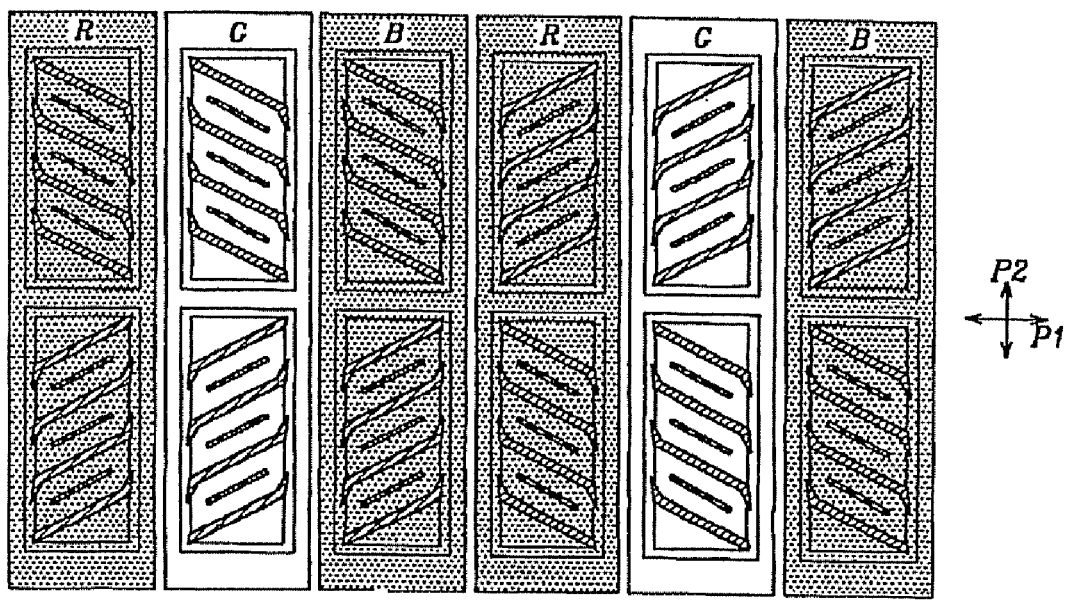

The various arrangement of pixels having different average axial directions are possible, and these embodiments are shown in FIGS. 14 and 15.

According to the ninth embodiment shown in FIG. 14, the pixels arranged in the row direction has the same average axial direction, while the adjacent pixels in a column have different average axial directions. In order to make different average axial directions, the oblique angles of apertures is differentiated.

On the contrary, according to the tenth embodiment shown in FIG. 15, the oblique angles of the apertures of adjacent pixels in a column are different, while, in row direction, the pixels in a dot including red, green and blue pixels has the same average axial direction, and the average axial direction is altered by unit of dot.

According to the embodiments of the present invention, multi-domain LCDs are formed using various aperture pattern to control the arrangement of liquid crystal molecules, therefore wide viewing angle is obtained, disclination is removed and the luminance is increased.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display comprising:
   a first substrate having an inner surface and an outer surface;
   a first electrode formed on the inner surface of said first substrate;
   a second substrate facing the first substrate and having an inner surface and an outer surface;
   a second electrode formed corresponding to the first electrode on the inner surface of the second substrate;
   a pixel region including a first edge extending in a transverse direction and a second edge extending in a longitudinal direction;
   a plurality of domains divided by tilt directions of liquid crystal molecules, wherein a number of axial directions of the liquid crystal molecules in a group of adjacent domains is four;
   a liquid crystal layer between the first and the second substrates;
   a first polarizer attached on the outer surface of said first substrate; and
   a second polarizer attached on the outer surface of said second substrate,
   wherein the axial direction of the liquid crystal molecules in each domain is tilted at an angle 45°±10° with respect to polarizing directions of the first polarizer and the second polarizer,
   wherein the polarizing direction of the first polarizer is substantially parallel to the first edge of the pixel region, and the polarizing direction of the second polarizer is substantially parallel to the second edge of the pixel region, and
   wherein long axes of liquid crystal molecules in the liquid crystal layer are aligned perpendicular to the substrates in a state that no voltage is applied to the electrodes.

2. The liquid crystal display of claim 1, wherein the first electrode includes a plurality of domain forming members.

3. The liquid crystal display of claim 1, wherein the group of adjacent domains has a first boundary extending in a transverse direction and a second boundary extending in a longitudinal direction formed therebetween.

4. The liquid crystal display of claim 3, wherein the group of adjacent domains has a point at which the first boundary and the second boundary intersect,
   wherein the liquid crystal molecules in the group of adjacent domains are tilted toward the point.

5. The liquid crystal display of claim 1, wherein the axial direction of the liquid crystal molecules in one of two domains adjacent to each other according to a transverse direction or a longitudinal direction, is tilted at an angle of 90°±10° with respect to the axial direction of the liquid crystal molecules in the other of two domains adjacent to each other according to a transverse direction or a longitudinal direction.

6. The liquid crystal display of claim 1, wherein the tilted shape of the liquid crystal molecules in the group of adjacent domains substantially forms a diamond shape when viewed on a plane.

7. The liquid crystal display of claim 1, wherein the polarizing direction of the first polarizer is perpendicular to the polarizing direction of the second polarizer.

* * * * *